(12) United States Patent
Do et al.

(10) Patent No.: US 12,054,054 B2
(45) Date of Patent: Aug. 6, 2024

(54) MOTOR NOISE REDUCTION CONTROL APPARATUS OF ECO-FRIENDLY VEHICLE AND METHOD FOR CONTROLLING THEREOF

(71) Applicants: HYUNDAI MOTOR COMPANY, Seoul (KR); KIA MOTORS CORPORATION, Seoul (KR)

(72) Inventors: Sang Hwa Do, Seongnam-si (KR); Nyeon Han Hong, Gwangmyeong-si (KR); Myung Gyu Kim, Seoul (KR); Kyoung Bum Kim, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 347 days.

(21) Appl. No.: 17/143,764

(22) Filed: Jan. 7, 2021

(65) Prior Publication Data
US 2022/0063422 A1 Mar. 3, 2022

(30) Foreign Application Priority Data
Aug. 26, 2020 (KR) .......................... 10-2020-0107512

(51) Int. Cl.
*B60L 15/20* (2006.01)
*H02P 6/10* (2006.01)

(52) U.S. Cl.
CPC ............ *B60L 15/2045* (2013.01); *H02P 6/10* (2013.01); *B60L 2240/421* (2013.01); *B60L 2240/423* (2013.01); *B60L 2240/427* (2013.01); *B60L 2240/429* (2013.01)

(58) Field of Classification Search
CPC ........... B60L 15/2045; B60L 2240/421; B60L 2240/423; B60L 2240/427; B60L 2240/429; B60L 15/20; B60L 2270/142; B60L 2270/145; B60L 2260/20; B60L 2270/14; H02P 6/10; H02P 21/05; H02P 21/0021;
(Continued)

(56) References Cited

U.S. PATENT DOCUMENTS

| | | | |
|---|---|---|---|
| 6,400,107 B1 * | 6/2002 | Nakatani | ................. H02P 6/085 318/400.32 |
| 2002/0097015 A1 * | 7/2002 | Kitajima | ................... H02P 6/10 318/432 |

(Continued)

OTHER PUBLICATIONS

Nikowitz et al., Reduction of the 6th and 12th harmonic in the torque ripple of a salient pole synchronous reluctance machine, 2019 (Year: 2019).*

*Primary Examiner* — James J Lee
*Assistant Examiner* — Alexander George Matta
(74) *Attorney, Agent, or Firm* — Morgan, Lewis & Bockius LLP

(57) ABSTRACT

A motor noise reduction control apparatus of an eco-friendly vehicle includes: a driving mode selector for selecting one of a high fuel economy driving mode and a low-noise driving mode; and a motor controller configured to generate a current command for motor drive using a maximum motor efficiency control application current map when the high fuel economy driving mode is selected, and to generate a current command for motor drive using a minimum torque ripple control application current map when the low-noise driving mode is selected.

6 Claims, 4 Drawing Sheets

(58) Field of Classification Search
CPC . H02P 6/04; H02P 21/14; Y02T 10/72; B60Y 2200/91; B60Y 2200/92
See application file for complete search history.

(56) References Cited

U.S. PATENT DOCUMENTS

| | | | |
|---|---|---|---|
| 2010/0052583 A1* | 3/2010 | Takamatsu | B60L 50/51 318/400.09 |
| 2011/0172859 A1* | 7/2011 | Sankaran | B60L 50/16 180/65.285 |
| 2016/0173013 A1* | 6/2016 | Kim | H02P 21/22 318/139 |
| 2016/0226408 A1* | 8/2016 | Yamakawa | H02P 6/10 |
| 2017/0366128 A1* | 12/2017 | Vaks | H02P 25/092 |
| 2022/0009643 A1* | 1/2022 | Datta | B60L 1/00 |

* cited by examiner

[FIG. 1]
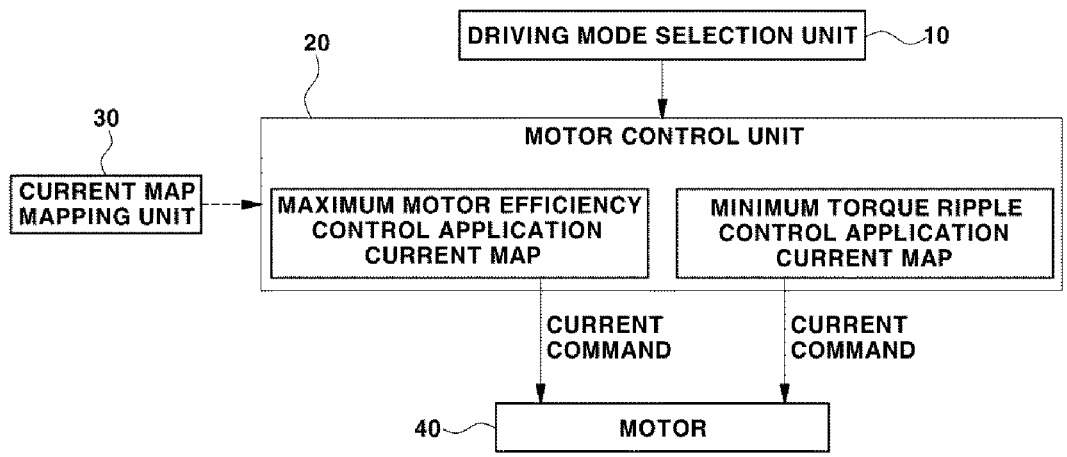
[FIG. 2]
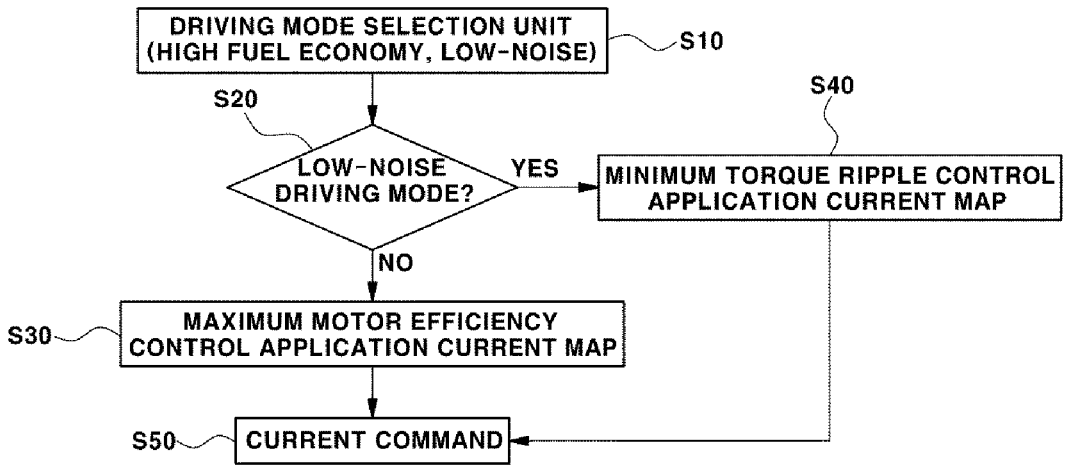

[FIG. 3]
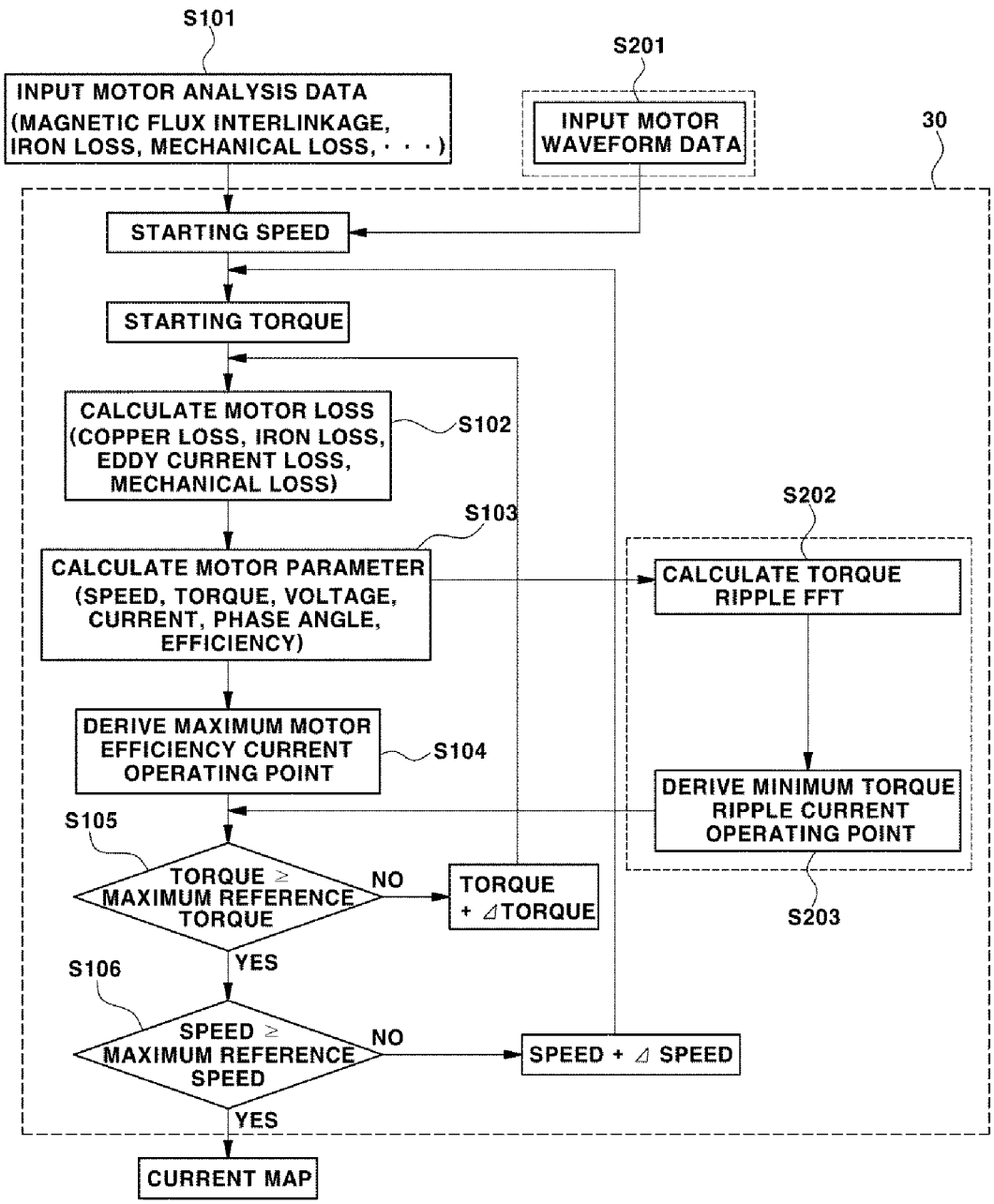

[FIG. 4]
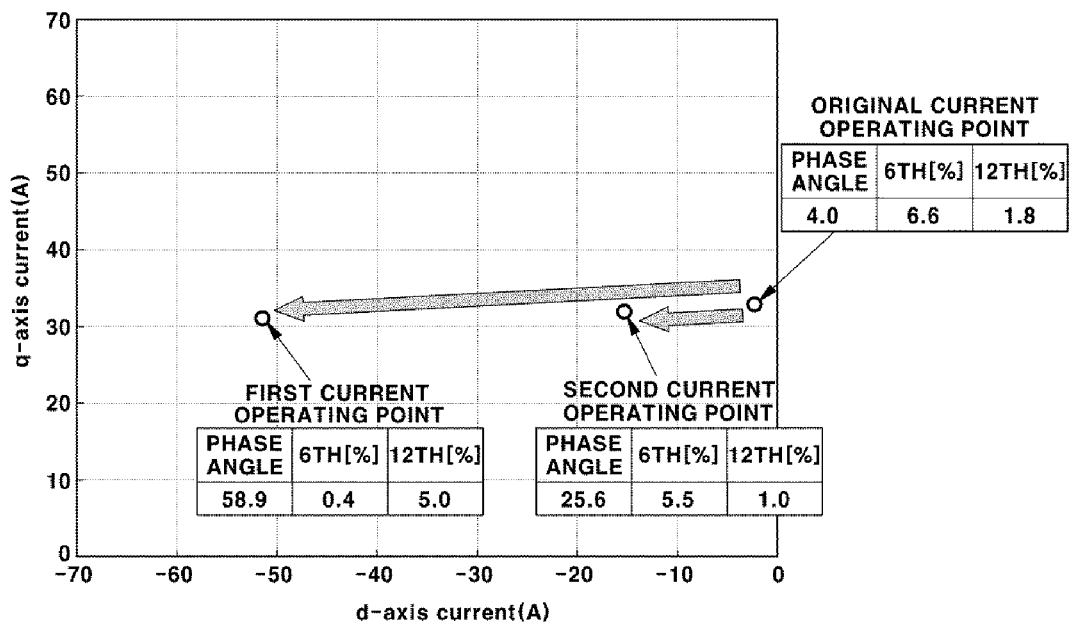

[FIG. 5]
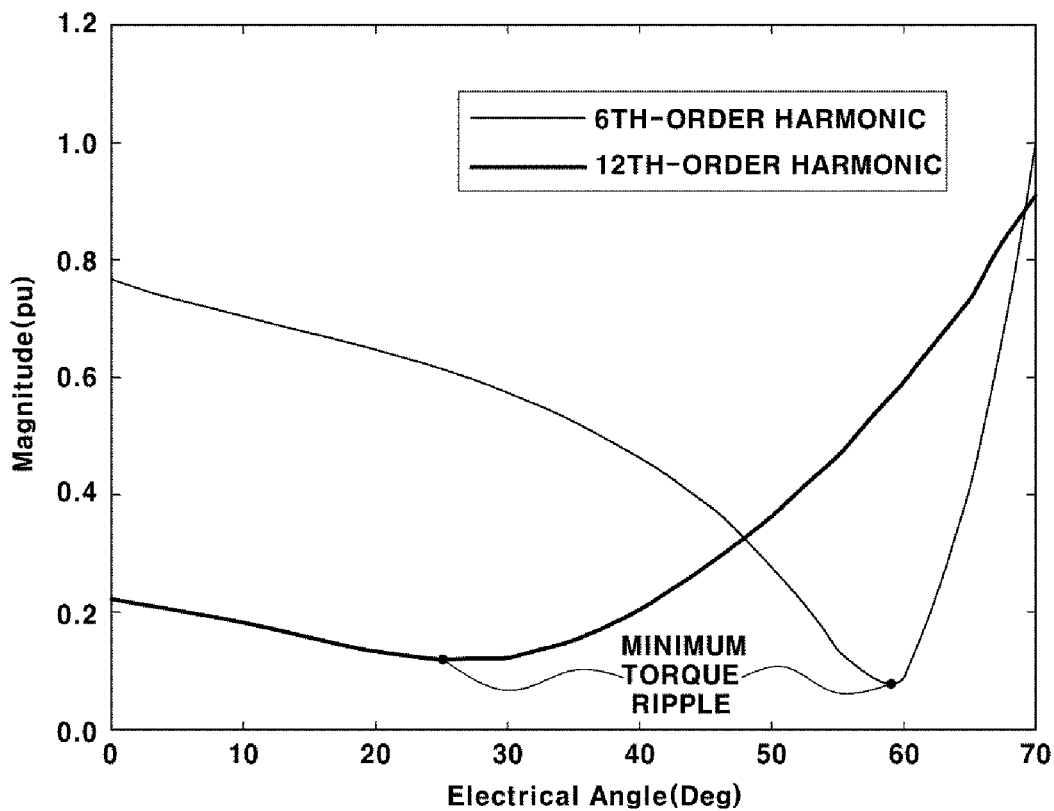
[FIG. 6] -PRIOR ART-
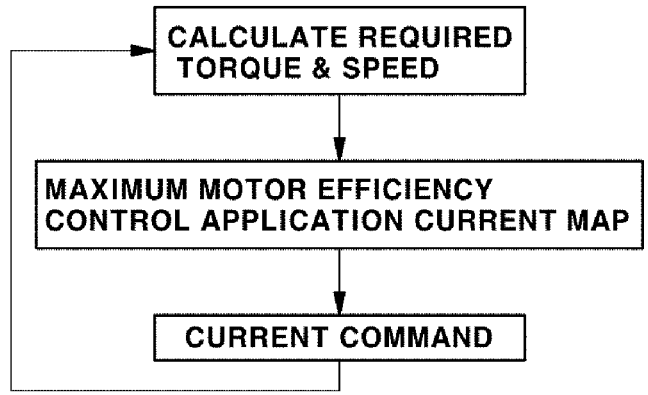

MOTOR NOISE REDUCTION CONTROL APPARATUS OF ECO-FRIENDLY VEHICLE AND METHOD FOR CONTROLLING THEREOF

CROSS REFERENCE TO RELATED APPLICATION

The present application claims the benefit of priority of Korean Patent Application No. 10-2020-0107512, filed on Aug. 26, 2020 in the Korean Intellectual Property Office, the entire contents of which are incorporated herein for all purposes by reference.

TECHNICAL FIELD

The present disclosure relates to a motor noise reduction control apparatus of an eco-friendly vehicle and a method of controlling thereof, and more particularly, to a motor noise reduction control apparatus of an eco-friendly vehicle and a method of controlling thereof, which are capable of maximizing NVH (Noise, Vibration, Harshness) performance while a motor for driving the eco-friendly vehicle is in operation.

BACKGROUND

Due to the trend of high power and high efficiency of eco-friendly vehicles, such as hybrid vehicles and electric vehicles, Interior Permanent Magnet Synchronous Motors (IPMSMs) whose permanent magnets are embedded inside the rotors, are widely mounted on the eco-friendly vehicles as driving motors.

Furthermore, eco-friendly vehicles on which these driving motors are mounted are also required to exhibit good Noise, Vibration, Harshness (NVH) performance as well as high efficiency thereof. If the motor noise is excessive, it may become annoying to a driver, which may greatly reduce commercial value of the vehicles.

It is known that the noise of the motor is mainly caused by cogging torque or torque ripple, and the torque ripple has a waveform that repeats with a certain size according to an electrical angle.

As shown in FIG. 6, the conventional motor drive control proceeds through calculating the required torque and speed, and issuing a current command matching the calculated required torque and speed from a maximum motor efficiency control application current map. Therefore, maximum efficiency control of the motor can be achieved, but there is a problem in that the motor noise annoying to the driver may be generated since the torque ripple of the motor is not dealt with at all.

As a pulsation phenomenon caused by a higher harmonic wave component of current or induced voltage, the torque ripple is an ineffective component that does not actually generate torque. Further, in the case of a three-phase motor, it is known that the torque ripple occurs due to the electrical 6th-order and 12th-order harmonic components.

In particular, during regenerative braking of the motor, an engine is not in operation, such that the noise of the motor is more noticeable. Therefore, a method of reducing the motor noise is necessary.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and the present disclosure is intended to propose a motor noise reduction control method of an eco-friendly vehicle, which can maximize Noise, Vibration, Harshness (NVH) performance of the vehicle by allowing a motor thereof to be driven according to a current command issued from a maximum motor efficiency control application current map while allowing the motor to be driven according a current command issued from a minimum torque ripple control application current map.

In order to achieve an aforementioned objective, according to one aspect of the present disclosure, there is provided a motor noise reduction control apparatus of an eco-friendly vehicle including: a driving mode selector for selecting one of a high fuel economy driving mode and a low-noise driving mod; and a motor controller configured to generate a current command for motor drive using a maximum motor efficiency control application current map when the high fuel economy driving mode is selected, and go generate a current command for motor drive using a minimum torque ripple control application current map when the low-noise driving mode is selected.

In order to achieve an aforementioned objective, according to another aspect of the present disclosure, there is provided a motor noise reduction control method of an eco-friendly vehicle including: selecting one of a high fuel economy driving mode and a low-noise driving mode; driving a motor according to a current command generated from a maximum motor efficiency control application current map when the high fuel economy driving mode is selected; and driving a motor according to a current command issued from a minimum torque ripple control application current map when the low-noise driving mode is selected.

The present disclosure may achieve advantageous effects as described below by providing above-mentioned embodiments for eliminating drawbacks.

When the high fuel economy driving mode is selected, the motor is driven by the current command from the maximum motor efficiency control application current map, whereas when the low-noise driving mode is selected, the motor is driven by the current command from minimum torque ripple control application current map, through which motor noise caused by the torque ripple can be reduced, thus maximizing the NVH performance of the vehicle.

BRIEF DESCRIPTION OF THE DRAWINGS

The above and other objectives, features and other advantages of the present disclosure will be more clearly understood from the following detailed description when taken in conjunction with the accompanying drawings, in which:

FIG. 1 is a configuration diagram illustrating a motor noise reduction control apparatus of an eco-friendly vehicle according to an embodiment of the present disclosure;

FIG. 2 is a flow chart illustrating a motor noise reduction control method of an eco-friendly vehicle according to an embodiment of the present disclosure;

FIG. 3 is a flowchart showing an example of construction of the minimum torque ripple control application current map for motor noise reduction control of the eco-friendly vehicle according to an embodiment of the present disclosure;

FIG. 4 is a current operating point diagram showing another example of construction of the minimum torque ripple control application current map for motor noise reduction control of the eco-friendly vehicle according to an embodiment of the present disclosure;

FIG. 5 is a waveform diagram comparing a 6th-order harmonic component and a 12th-order harmonic component that are obtained by analyzing one cycle of a torque waveform at an operating point for each current phase angle of a motor by an FFT method; and FIG. 6 is a flow chart illustrating an example of a conventional motor drive control.

DETAILED DESCRIPTION

Hereinbelow, exemplary embodiments of the present disclosure will be described in detail with reference to the accompanying drawings. Throughout the drawings, the same reference numerals will refer to the same or like parts.

Referring to FIG. 5, it may be confirmed that, when comparing a 6th-order harmonic component and a 12th-order harmonic component that are obtained by analyzing one cycle of a torque waveform at each operating point through a fast fourier transform (FFT) method after deriving the operating points for each electric current phase angle of a motor satisfying a required torque, there is an electric current phase angle at which torque ripple is minimized at a certain torque.

Accordingly, a primary objective of the present disclosure is to maximize the NVH performance of a vehicle by reducing motor noise caused by the torque ripple, wherein the noise reduction may be achieved by allowing a motor of the vehicle to be driven according to a current command issued from a minimum torque ripple control application current map which is also applied to a motor controller for motor drive control besides a maximum motor efficiency control application current map.

Referring to FIG. 1, a motor noise reduction control apparatus of the present disclosure may include: a driving mode selector 10 for selecting one of a high fuel economy driving mode and a low-noise driving mode; and a motor controller 20 which issues a current command for motor drive using a maximum motor efficiency control application current map when the high fuel economy driving mode is selected through the driving mode selector 10, or issues a current command for motor drive using a minimum torque ripple control application current map when the low-noise driving mode is selected through the driving mode selector 10.

As shown in FIG. 3, the maximum motor efficiency control application current map may be constructed through inputting motor analysis data to a current map mapping unit 30 (S101), calculating motor loss including copper loss, iron loss, eddy current loss, and mechanical loss after applying a starting speed and a starting torque to a motor (S102), calculating motor parameters including speed, torque, voltage, current, phase angle, and efficiency of the motor (S103), deriving a maximum motor efficiency operating point based on the motor loss and the motor parameters (S104), and checking whether torque and speed according to the derived maximum motor efficiency operating point satisfy a maximum reference torque and a maximum reference speed (S105, S106), and may be stored in the motor controller 20.

According to the present disclosure, when constructing the maximum motor efficiency control application current map, the minimum torque ripple control application current map may be constructed together.

The minimum torque ripple control application current map may be constructed through further inputting motor torque waveform data when performing the inputting of the motor analysis data to the current map mapping unit 30 of the construction of the maximum motor efficiency control application current map (S201), calculating torque ripple using a FFT method (S202), deriving a minimum torque ripple current operating point at which 6th-order and 12th-order harmonics are minimized based on the calculated torque ripple (S203), and checking whether torque and speed according to the minimum torque ripple current operating point satisfy a maximum reference torque and a maximum reference speed.

In other words, the minimum torque ripple control application current map may be constructed through inputting motor torque waveform data together with motor analysis data to the current map mapping unit 30 (S201), calculating motor loss including copper loss, iron loss, eddy current loss, and mechanical loss after applying a starting speed and a starting torque to a motor (S102), calculating motor parameters including speed, torque, voltage, current, phase angle, and efficiency of the motor (S103), calculating torque ripple using a FFT method (S202), and deriving a minimum torque ripple current operating point at which 6th-order and 12th-order harmonics are minimized based on the calculated torque ripple (S203), and may be stored in the motor controller 20.

FIG. 2 is a flow chart illustrating a motor noise reduction control method of an eco-friendly vehicle according to an embodiment of the present disclosure.

First, the motor driving mode may include the high fuel economy driving mode and the low-noise driving mode, and a driver may select one of the high fuel economy driving mode and the low-noise driving mode using the driving mode selector 10 that may be mounted in the form of a switch, e.g., a button, a touch screen, etc., near the driver's seat (S10).

Next, the motor controller 20 may check whether the motor driving mode has been selected as the high fuel economy driving mode or the low-noise driving mode (S20).

Accordingly, when the motor controller 20 determines that the motor driving mode has been selected as the high fuel efficiency driving mode, the current command is issued to the motor by using the maximum motor efficiency control application current map (S30, S50).

Therefore, the motor drive is performed according to the operating point where the motor efficiency is maximized.

In contrast, when the motor controller 20 determines that the motor driving mode has been selected as the low-noise driving mode, the current command is issued to the motor by using the minimum torque ripple control application current map (S40, S50).

Accordingly, the motor drive is performed according to the minimum torque ripple current operating point at which the 6th-order and 12th-order harmonics are minimized.

On the other hand, torque ripple (6th-order and 12th-order harmonics) generated when the motor is driven with the maximum motor efficiency control application current map by selecting the high fuel economy driving mode, and torque ripple (6th-order and 12th-order harmonics) generated when the motor is driven with the minimum torque ripple control application current map by selecting the low-noise driving mode were compared and tested, and the results are as shown in Table 1 below.

TABLE 1

| SPEED [RPM] | TORQUE [NM] | EFFICIENCY [%] | PHASE ANGLE [DEG] | 6TH[%] | 12TH[%] | REMARKS |
|---|---|---|---|---|---|---|
| 1400 | 30 | reference | 4.0 | 6.6 | 1.8 | HIGH FUEL ECONOMY DRIVING MODE |
| | | −1.6% | 58.9 | 0.4 | 5.0 | LOW-NOISE |
| | | 0.0% | 25.6 | 5.5 | 1.0 | DRIVING MODE |
| | 100 | reference | 12.1 | 5.8 | 1.3 | HIGH FUEL ECONOMY DRIVING MODE |
| | | −1.9% | 45.0 | 1.1 | 3.3 | LOW-NOISE |
| | | 0.0% | 15.0 | 5.5 | 1.2 | DRIVING MODE |
| | 205 | reference | 19.4 | 2.4 | 0.7 | HIGH FUEL ECONOMY DRIVING MODE |
| | | −0.5% | 29.3 | 1.1 | 1.1 | LOW-NOISE |
| | | −0.2% | 25.0 | 1.2 | 0.6 | DRIVING MODE |

As shown in Table 1, it can be understood that the torque ripple (6th-order and 12th-order harmonics) generated when the motor is driven with the minimum torque ripple control application current map by selecting the low-noise driving mode was greatly reduced when compared to the torque ripple (6th-order and 12th-order harmonics) generated when the motor is driven with the maximum motor efficiency control application current map by selecting the high fuel economy driving mode.

For example, referring to Table 1 above, the torque ripples (6th-order and 12th-order harmonics) generated when the motor is driven with the maximum motor efficiency control application current map by selecting the high fuel economy driving mode at a motor speed of 1400 rpm and a torque of 30 Nm are 6.6 and 1.8, respectively, whereas the torque ripples (6th-order and 12th-order harmonics) generated when the motor is driven with the minimum torque ripple control application current map by selecting the low-noise driving mode are reduced to 5.5 and 1.0, respectively.

Therefore, when the driver selects the low-noise driving mode, the motor is driven by the current command issued from the minimum torque ripple control application current map, so that the motor noise caused by the torque ripple can be reduced, thus simultaneously maximizing the NVH performance of the vehicle.

FIG. 4 is a current operating point diagram showing another example of construction of the minimum torque ripple control application current map for motor noise reduction control of the eco-friendly vehicle according to an exemplary of the present disclosure.

After the minimum torque ripple control application current map is constructed in a different way and stored in the motor controller 20, the motor drive may be controlled according to the current operating points shown in FIG. 4.

For example, another example of construction of the minimum torque ripple control application current map may proceed through performing NVH evaluation of measuring the noise level according to speed and torque of the motor when mapping the maximum motor efficiency control application current map of the motor, calculating a high noise region in which high noise occurs among operating regions of the motor from the NVH evaluation results, that is, noise measurement results, and selecting a current operating point at which 6th-order and 12th-order harmonics are minimized from among the current operating points corresponding to the high noise region, and may be stored in the motor controller 20.

Accordingly, when the driver selects the low-noise driving mode, as shown in FIG. 4, the original current operating point according to the maximum motor efficiency control application current map may be selected as the first current operating point or the second current operating according to the minimum torque ripple control application current map to drive the motor.

In this regard, the first current operating point or the second current operating point refers to a current operating point at which 6th-order and 12th-order harmonics are minimized among the current operating points corresponding to the high noise region.

Therefore, as shown in FIG. 4, the torque ripples (6th-order and 12th-order harmonics) generated when the motor is driven according to the original current operating point are 6.6 and 1.8, but it may be understood that the torque ripple (6th-order harmonic) generated when the motor is driven according to the first current operating point is decreased to 0.4, and the torque ripple (12th-order harmonic) generated when the motor is driven according to the second current operating point is decreased to 1.0.

As described above, when the high fuel economy driving mode is selected, the motor is driven by the current command from the maximum motor efficiency control application current map, whereas when the low-noise driving mode is selected, the motor is driven by the current command from minimum torque ripple control application current map, through which motor noise caused by the torque ripple can be reduced, thus maximizing the NVH performance of the vehicle.

Although exemplary embodiments of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A motor noise reduction control apparatus of an eco-friendly vehicle, the noise reduction control apparatus comprising:
   a driving mode selector for selecting one of a high fuel economy driving mode and a low-noise driving mode; and
   a motor controller configured to generate a current command for motor drive using a maximum motor efficiency control application current map when the high fuel economy driving mode is selected, and to generate a current command for motor drive using a minimum torque ripple control application current map when the low-noise driving mode is selected,
   wherein the minimum torque ripple control application current map is obtained by:

calculating a torque ripple using a Fast Fourier Transform (FFT);

deriving a minimum torque ripple current operating point at which only both of 6th-order and 12th-order harmonics are reduced to minimum points, respectively, based on the calculated torque ripple; and checking whether torque and speed of the motor according to the minimum torque ripple current operating point satisfy a maximum reference torque and a maximum reference speed.

2. The motor noise reduction control apparatus of claim 1, wherein the minimum torque ripple control application current map is obtained by:

inputting motor torque waveform data together with motor analysis data to a current map mapping unit;

calculating motor loss including copper loss, iron loss, eddy current loss, and mechanical loss after applying a starting speed and a starting torque to a motor; and calculating motor parameters including a speed, a torque, a voltage, a current, a phase angle, and an efficiency of the motor.

3. The motor noise reduction control apparatus of claim 1, wherein the minimum torque ripple control application current map is obtained by:

measuring a noise level according to a speed and a torque of the motor when mapping the maximum motor efficiency control application current map of the motor;

calculating a high noise region in which high noise occurs among operating regions of the motor from measurement results of the measuring a noise level; and selecting a current operating point at which the 6th-order and 12th-order harmonics are reduced to the minimum points, respectively, from among current operating points corresponding to the high noise region, wherein the obtained minimum torque ripple control application current map is stored in the motor controller.

4. A motor noise reduction control method of an eco-friendly vehicle, the noise reduction control method comprising:

selecting one of a high fuel economy driving mode and a low-noise driving mode;

driving a motor according to a current command generated from a maximum motor efficiency control application current map when the high fuel economy driving mode is selected; and driving the motor according to a current command generated from a minimum torque ripple control application current map when the low-noise driving mode is selected, wherein the minimum torque ripple control application current map is obtained by:

calculating a torque ripple using a Fast Fourier Transform (FFT) method;

deriving a minimum torque ripple current operating point at which only both of 6th-order and 12th-order harmonics are reduced to minimum points, respectively, based on the calculated torque ripple; and checking whether torque and speed of the motor according to the minimum torque ripple current operating Point satisfy a maximum reference torque and a maximum reference speed.

5. The motor noise reduction method of claim 4, wherein the minimum torque ripple control application current map is obtained by:

inputting motor torque waveform data together with motor analysis data to a current map mapping unit;

calculating motor loss including copper loss, iron loss, eddy current loss, and mechanical loss after applying a starting speed and a starting torque to the motor; and calculating motor parameters including a speed, a torque, a voltage, a current, a phase angle, and an efficiency of the motor.

6. The motor noise reduction method of claim 4, wherein the minimum torque ripple control application current map is obtained by:

measuring a noise level according to speed and torque of the motor when mapping the maximum motor efficiency control application current map of the motor;

calculating a high noise region in which high noise occurs among operating regions of the motor from the measurement results; and selecting a current operating point at which the 6th-order and 12th-order harmonics are reduced to the minimum points, respectively, from among current operating points corresponding to the high noise region.

* * * * *